United States Patent
van Bochove-Gutierrez

(10) Patent No.: US 12,210,573 B2
(45) Date of Patent: Jan. 28, 2025

(54) METHODS AND SYSTEMS FOR CHAINING BIOGRAPHIC INPUTS USING ARTIFICIAL INTELLIGENCE

(71) Applicant: Hillegonda Hendrika van Bochove-Gutierrez, Boston, MA (US)

(72) Inventor: Hillegonda Hendrika van Bochove-Gutierrez, Boston, MA (US)

( * ) Notice: Subject to any disclaimer, the term of this patent is extended or adjusted under 35 U.S.C. 154(b) by 628 days.

(21) Appl. No.: 16/881,345

(22) Filed: May 22, 2020

(65) Prior Publication Data
US 2020/0380036 A1    Dec. 3, 2020

Related U.S. Application Data

(60) Provisional application No. 62/853,289, filed on May 28, 2019.

(51) Int. Cl.
*G06F 16/9035*    (2019.01)
*G06F 16/901*    (2019.01)
(Continued)

(52) U.S. Cl.
CPC ........ *G06F 16/9035* (2019.01); *G06F 16/901* (2019.01); *G06F 16/9038* (2019.01); *G06F 16/906* (2019.01); *G06N 20/00* (2019.01)

(58) Field of Classification Search
CPC ............... G06F 16/9035; G06F 16/901; G06F 16/9038; G06F 16/906; G06F 16/2428;
(Continued)

(56) References Cited

U.S. PATENT DOCUMENTS

| | | |
|---|---|---|
| 7,698,640 B2 | 4/2010 | Krieglstein |
| 8,103,947 B2 | 1/2012 | Lunt et al. |
| | (Continued) | |

FOREIGN PATENT DOCUMENTS

CN    104462371 A    3/2015

OTHER PUBLICATIONS https://play.google.com/store/apps/details?id=com.memlife. MemLife.
https://techcrunch.com/2014/11/21/photo-sharing-app-memoir-snags-5-5-million-to-help-you-recall-the-past/.

*Primary Examiner* — Irete F Ehichioya
*Assistant Examiner* — Xiaoqin Hu
(74) *Attorney, Agent, or Firm* — Caldwell Intellectual Property Law

(57) ABSTRACT

A system for chaining biographic inputs using artificial intelligence includes a computing device, a biographic parameter module operating on the computing device wherein the biographic parameter module is configured to receive a first biographic input wherein the first biographic input identifies a user; parse the first biographic input to retrieve a key element; and retrieve an element of stored data relating to the key element wherein the element of stored data further comprises a plurality of biographic inputs; and a chaining module, the transmission module configured to receive the first biographic input and the element of stored data from the biographic parameter module; evaluate the first biographic input and the element of stored data to determine a relation between the first biographic input and the element of stored data; and chain the first biographic input and the element of stored data.

20 Claims, 5 Drawing Sheets

(51) Int. Cl.
*G06F 16/9038* (2019.01)
*G06F 16/906* (2019.01)
*G06N 20/00* (2019.01)

(58) Field of Classification Search
CPC .... G06F 40/134; G06F 40/169; G06F 40/216; G06F 40/284; G06N 20/00; G06N 7/005
See application file for complete search history.

(56) References Cited

U.S. PATENT DOCUMENTS

| | | |
|---|---|---|
| 8,805,348 B2 | 8/2014 | Matsuoka |
| 8,819,533 B2 | 8/2014 | Trotto et al. |
| 9,529,841 B1 | 12/2016 | Girdwood |
| 2007/0250479 A1 | 10/2007 | Lunt et al. |
| 2009/0238538 A1 | 9/2009 | Fink |
| 2010/0293037 A1 | 11/2010 | Devincent |
| 2013/0173531 A1* | 7/2013 | Rinearson ............... G06Q 30/02 707/608 |
| 2014/0032567 A1* | 1/2014 | Assadollahi ........ G06F 16/3347 707/742 |
| 2014/0233919 A1 | 8/2014 | Sabatino |
| 2014/0237330 A1 | 8/2014 | Pitzner |
| 2015/0288782 A1 | 10/2015 | Deng et al. |
| 2018/0329874 A1 | 11/2018 | Peden |
| 2018/0349790 A1* | 12/2018 | Cai ....................... G06N 20/00 |
| 2019/0051032 A1 | 2/2019 | Chu et al. |

\* cited by examiner

METHODS AND SYSTEMS FOR CHAINING BIOGRAPHIC INPUTS USING ARTIFICIAL INTELLIGENCE

CROSS-REFERENCE TO RELATED APPLICATIONS

This application claims the benefit of priority of U.S. Provisional Patent Application Ser. No. 62/853,289, filed on May 28, 2019, and titled "METHODS AND SYSTEMS FOR SELF-EVALUATION," which is incorporated by reference herein in its entirety.

FIELD OF THE INVENTION

The present invention generally relates to the field of artificial intelligence. In particular, the present invention is directed to methods and systems for chaining biographic inputs using artificial intelligence.

BACKGROUND

Remembering precious moments from one's life can be challenging. Often memories fade, and events become tangled in one's mind. Knowing who was present for certain life events can be a frustrating and time-consuming challenge.

SUMMARY OF THE DISCLOSURE

In an aspect, a system for chaining biographic inputs using artificial intelligence the system comprising a computing device; a biographic parameter module operating on the computing device wherein the biographic parameter module is configured to receive a first biographic input wherein the first biographic input identifies a user; parse the first biographic input to retrieve a key element; and retrieve an element of stored data relating to the key element wherein the element of stored data further comprises a plurality of biographic inputs; and a chaining module, the transmission module configured to receive the first biographic input and the element of stored data from the biographic parameter module; evaluate the first biographic input and the element of stored data to determine a relation between the first biographic input and the element of stored data; generate a request for a second biographic input as a function of the first biographic input and the element of stored data; and chain the first biographic input and the element of stored data.

In an aspect, A method of chaining biographic inputs using artificial intelligence the method comprising receiving by a computing device, a first biographic input wherein the first biographic input identifies a user; parsing by the computing device, the first biographic input to retrieve a key element; and retrieving by the computing device, an element of stored data relating to the key element wherein the element of stored data further comprises a plurality of biographic inputs; evaluating by the computing device, the first biographic input and the element of stored data to determine a relation between the first biographic input and the element of stored data; generating by the computing device, a request for a second biographic input as a function of the first biographic input and the element of stored data; and chaining by the computing device, the first biographic input and the element of stored data.

These and other aspects and features of non-limiting embodiments of the present invention will become apparent to those skilled in the art upon review of the following description of specific non-limiting embodiments of the invention in conjunction with the accompanying drawings.

BRIEF DESCRIPTION OF THE DRAWINGS

For the purpose of illustrating the invention, the drawings show aspects of one or more embodiments of the invention. However, it should be understood that the present invention is not limited to the precise arrangements and instrumentalities shown in the drawings, wherein.

The drawings are not necessarily to scale and may be illustrated by phantom lines, diagrammatic representations, and fragmentary views. In certain instances, details that are not necessary for an understanding of the embodiments or that render other details difficult to perceive may have been omitted.

DETAILED DESCRIPTION

At a high level, aspects of the present disclosure are directed to systems and methods for chaining biographic inputs using artificial intelligence. A first biographic input is utilized in combination with one or more machine-learning algorithms to locate stored data relating to the first biographic input. Such information is chained together and stored in a database organized by milestone labels.

Figure 1:
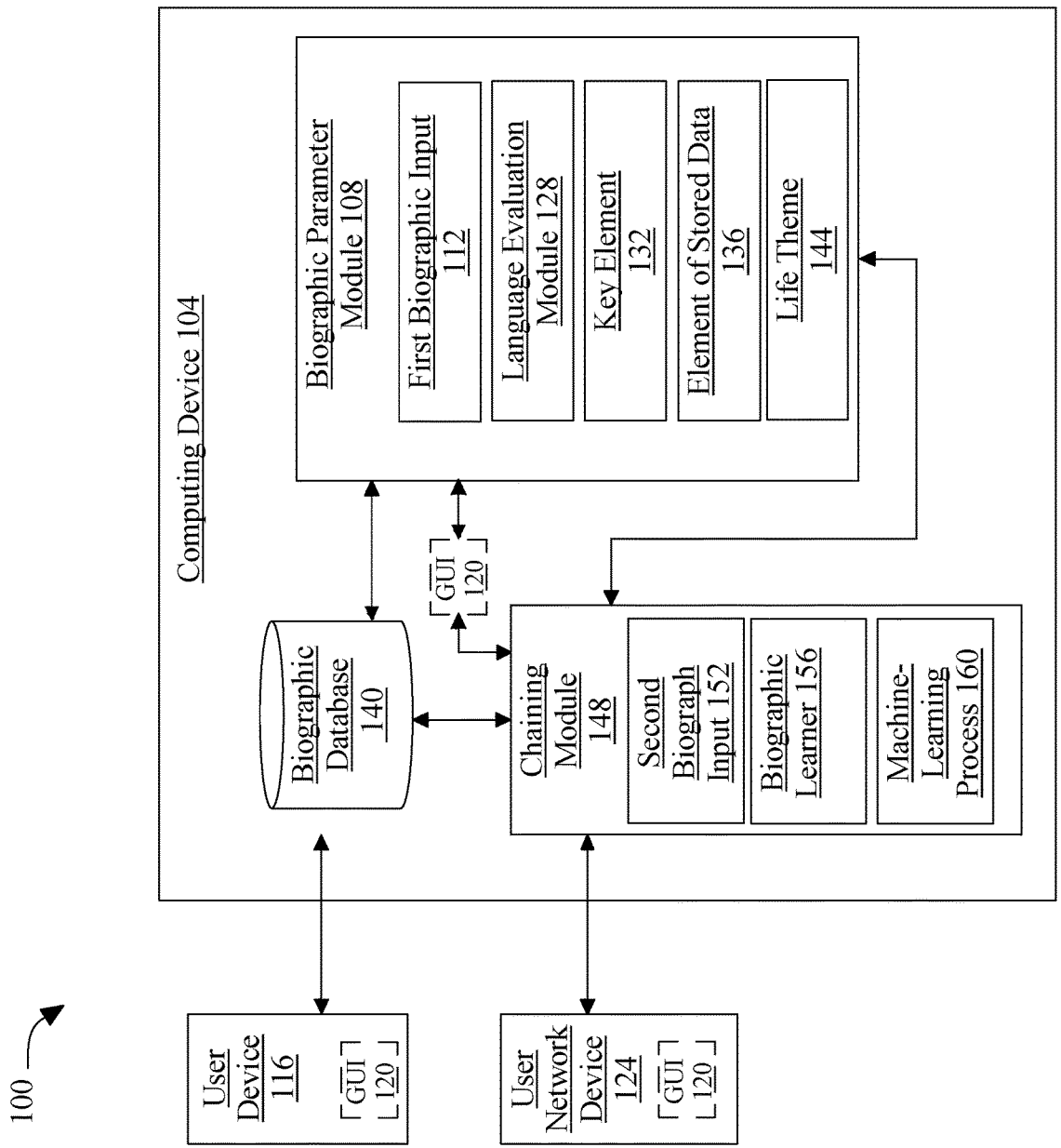
FIG. 1 is a block diagram illustrating an exemplary embodiment of a system for chaining biographic inputs using artificial intelligence.

Referring now to the drawings, FIG. 1 illustrates an exemplary embodiment of a system 100 for chaining biographic inputs using artificial intelligence. System 100 includes a computing device 104. A computing device 104 may include any computing device as described herein, including without limitation a microcontroller, microprocessor, digital signal processor (DSP) and/or system on a chip (SoC). A computing device 104 may include, be included in, and/or communicate with a mobile device such as a mobile telephone or smartphone. A computing device 104 may include a single computing device operating independently, or may include two or more computing device operating in concert, in parallel, sequentially or the like; two or more computing devices may be included together in a single computing device or in two or more computing devices. A computing device 104 may communicate with other devices such as a user device as described in more detail below through a network interface. Network interface device may be utilized for connecting a computing device 104 to one or more of a variety of networks, and one or more devices. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network may employ a wired and/or a wireless mode of communication. In general, any network topology may be used. Information (e.g., data, software etc.) may be communicated to and/or from a computer and/or a computing device. A computing device 104 may include but is not limited to, for example, a computing device 104 or cluster of computing devices in a first location and a second computing device or cluster of computing devices in a second location. A computing device 104 may include one or more computing devices dedicated to data storage, security, distribution of traffic for load balancing, and the like. A computing device 104 may distribute one or more computing tasks as described below across a plurality of computing devices of computing device, which may operate in parallel, in series, redundantly, or in any other manner used for distribution of tasks or memory between computing devices. A computing device 104 may be implemented using a "shared nothing" architecture in which data is cached at the worker, in an embodiment, this may enable scalability of system 100 and/or computing device.

Continuing to refer to FIG. 1, computing device 104 may be designed and/or configured to perform any method, method step, or sequence of method steps in any embodiment described in this disclosure, in any order and with any degree of repetition. For instance, computing device 104 may be configured to perform a single step or sequence repeatedly until a desired or commanded outcome is achieved; repetition of a step or a sequence of steps may be performed iteratively and/or recursively using outputs of previous repetitions as inputs to subsequent repetitions, aggregating inputs and/or outputs of repetitions to produce an aggregate result, reduction or decrement of one or more variables such as global variables, and/or division of a larger processing task into a set of iteratively addressed smaller processing tasks. Computing device 104 may perform any step or sequence of steps as described in this disclosure in parallel, such as simultaneously and/or substantially simultaneously performing a step two or more times using two or more parallel threads, processor cores, or the like; division of tasks between parallel threads and/or processes may be performed according to any protocol suitable for division of tasks between iterations. Persons skilled in the art, upon reviewing the entirety of this disclosure, will be aware of various ways in which steps, sequences of steps, processing tasks, and/or data may be subdivided, shared, or otherwise dealt with using iteration, recursion, and/or parallel processing.

With continued reference to FIG. 1, system 100 includes a biographic parameter module 108 operating on computing device 104. Biographic parameter module 108 may be implemented as any suitable hardware and/or software module. Biographic parameter module is designed and configured to receive a first biographic input 112. A "biographic input," as used in this disclosure, is data, including any numerical, character, and/or textual data describing a moment in time of a user's life. First biographic input 112 may include a description, report, story, tale, statement, explanation, interpretation, account, portrayal, reflection, summary, answer to a question, photograph, video, and/or combination of any of the above describing a user's life. First biographic input 112 identifies a user, who's life a first biographic input 112 may relate to. First biographic input 112 may include a reference or mention to a particular event in a user's life. For example, first biographic input 112 may describe a user's third birthday party or when a user won first place in a dance competition. First biographic input 112 may include a reference or mention to a particular year in a user's life. For example, first biographic input 112 may reference the year 1987, when the user was three years old or user's first year of college. In yet another non-limiting example, first biographic input 112 may reference the user's seventh year of marriage. First biographic input 112 may include a reference or mention to a particular category of data concerning a user's life that may have particular shared characteristics. Categories may include for example, groupings of certain time period or moments in a user's life. Time periods may be organized into categories that are organized according to age of a user. For example, categories may include childhood, adolescence, teenage, and adulthood. Time period may be organized by particular defining moments of a user's life, such as first job, first marriage, first death, and the like. Categories may include groupings by certain locations where a user lives, jobs a user works, and/or activities a user participates in. Categories may be broken down further into sub-categories, which may include sub-groupings having particular shared characteristics. For example, a category such as location where a user lives may be broken down into sub-categories that may include different addresses a user lived at in one specific area. In such an instance, a category such as user's life while living in San Francisco, may be broken down further into sub-categories that may include an apartment a user lived at in Mission District, followed by a house the user lived at in Haight-Ashbury.

With continued reference to FIG. 1, biographic parameter module 108 receives a first biographic input 112 from a user device 116. User device 116 may include an additional computing device, such as a mobile device, laptop, computer, or the like. In an embodiment, user device 116 may be a computer and/or workstation operated by a user. User device 116 may include a graphical user interface (GUI) 120, which may display information and/or prompt a user for information pertaining to a first biographic input 112. Graphical user interface 120 may include without limitation a form or other graphical element having data entry fields, where a user may enter information describing one or more biographic inputs. Fields in Graphical user interface 120 may provide options describing previously entered biographic inputs and asking for further elaboration and/or details pertaining to at least a biographic datum. For instance, a "drop-down" list may appear where a user can select one or more previously entered biographic inputs and select one or more entries to provide further description or details. In an embodiment, a user may select one or more biographic inputs that may then present follow up questions prompting a user to provide further reflections and/or details about a particular biographic input. In such an instance, a user may be able to skip questions that user does not know the answer to, cannot remember, and/or doesn't feel comfortable answering. Graphical user interface 120 may provide one or more fields pertaining to a user's network of family or friends as described in more detail below who may provide input pertaining to a user's biographic inputs. In an embodiment, user's network of family or friends may provide input and/or details pertaining to at least a biographic datum. In an embodiment, user's network of family or friends may be presented with questions prompting family and friends to provide further reflections and/or details pertaining to particular biographic inputs. Family and friends may be able to skip questions for similar reasons user may skip particular questions as described above. Graphical user interface 120 may organize one or more biographic inputs. For example, Graphical user interface 120 may sort one or more biographic inputs into chronological order, reverse chronological order, or into other categories a user may request. In an embodiment, Graphical user interface 120 may provide one or more fields that allow a user to enter a keyword search to find a particular biographic input that may be contained within Graphical user interface 120. For example, a user looking to find a biographic input that describes a user' sixteenth birthday party may type "sixteenth birthday" into a text field to search for biographic inputs containing those keywords. Biographic parameter module receives a first biographic input 112 from a user device utilizing any network methodology as described herein.

With continued reference to FIG. 1, biographic parameter module 108 receives a first biographic input 112 from a user network device 124. User network device 124 may include an additional computing device, such as a mobile device, laptop, desktop computer, or the like. User network device 124 may be operated by a user network participant. User network participant may include family, friends, acquittances, co-workers, colleagues, and the like that may have some connection to or knowledge of user's life. For example, user network participant may include user's college roommate, user's high school math teacher, user's volleyball coach, user's boss at user's current job and the like. User network device 124 may include Graphical user interface 120. In an embodiment, user may invite user's network to participate within system 100 through Graphical user interface 120. For example, Graphical user interface 120 may contain one or more fields that allow a user to enter user network participants within user's network to participate within system 100. This may be done for example, by transmitting a request over the internet and/or transmitting a request to user network device 124. Graphical user interface 120 may contain a text field that may allow a participant within user's network to accept an invitation to participate within system 100 and/or reject an invitation to participate within system 100. Graphical user interface 120 displayed on user network device 124 may contain biographic inputs describing participant's own life and/or biographic inputs received from user device 116. Graphical user interface 120 located on user network device 124 may contain a data entry field asking a participant within user's network for information pertaining to a first biographic input 112 pertaining to user's life. In an embodiment, Graphical user interface 120 displayed on user network device 124 may provide questions prompting a participant within user's network for more information or elaboration as to first biographic input 112. In such an instance, participant within user's network may decline to answer questions for any reason such as a vague memory as to biographic input, feeling uncomfortable with information contained within biographic input, and/or an unwillingness to elaborate.

With continued reference to FIG. 1, biographic parameter module 108 may contain language evaluation module 128. Language evaluation module 128 may be implemented as any suitable hardware and/or software module. Language evaluation module 128 may be designed and configured to parse a first biographic input 112 to extract a key element 132. Language evaluation module 128 may be configured to extract, from one or more biographic inputs, one or more words. One or more words may include, without limitation, strings of one or more characters, including without limitation any sequence or sequences of letters, numbers, punctuation, diacritic marks, engineering symbols, geometric dimensioning and tolerancing (GD&T) symbols, chemical symbols and formulas, spaces, whitespace, and other symbols, including any symbols usable as textual data. Textual data may be parsed into tokens, which may include a simple word (sequence of letters separated by whitespace) or more generally a sequence of characters. The term "token," as used herein, refers to any smaller, individual groupings of text from a larger source of text; tokens may be broken up by word, pair of words, sentence, or other delimitation. These tokens may in turn be parsed in various ways. Textual data may be parsed into words or sequences of words, which may be considered words as well. Textual data may be parsed into "n-grams", where all sequences of n consecutive characters are considered. Any or all possible sequences of tokens or words may be stored as "chains", for example for use as a Markov chain or Hidden Markov Model.

With continued reference to FIG. 1, language evaluation module 128 may operate to produce a language evaluation model. Language evaluation model may include a program automatically generated by language evaluation module to produce associations between one or more words extracted from a first biographic input 112 and detect associations, including without limitation mathematical associations between such words, and/or associations of extracted words with categories, moments, events, and other participants in user's life. Association between language elements, where language elements include for purposes herein, extracted words, categories of user's life events, moments of user's life, events that occurred during user's life, and participants in user's life, may include, without limitation, mathematical associations, including without limitation statistical correlations between any language element and any other language element and/or language elements. Statistical correlations and/or mathematical associations may include probabilistic formulas or relationships indicating, for instance, a likelihood that a given extracted word indicates a given category of a user's life, a given moment of a user's life, and/or a given participant in a user's life and/or event or moment. As a further example, statistical correlations and/or mathematical associations may include probabilistic formulas or relationships indicating a positive and/or negative association between at least an extracted word and/or a given category of a user's life, a given moment of a user's life, and/or a given participant in a user's life and/or event or moment; positive or negative indication may include an indication that a given biographic datum is or is not indicating a category of a user's life, a given moment of a user's life, and/or a given participant in a user's life and/or event or moment is or is not significant. For instance, and without limitation, a negative indication may be determined from a phrase such as "a third birthday party is not correlated to adulthood," whereas a positive indication may be determined from a phrase such as "a third birthday party is correlated to a toddler," as an illustrative example; whether a phrase, sentence, word, or other textual element in a biographic input or corpus of documents constitutes a positive or negative indicator may be determined, in an embodiment, by mathematical associations between detected words, comparisons to phrases and/or words indicating positive and/or negative indicators contained within a biographic input and/or biographic datum. Language evaluation module 128 may contain a voice recognition table that may identify spoken commands such as when a user interacts with Graphical user interface 120 through a voice to text option. For example, a user may generate a first biographic input 112 by speaking into Graphical user interface 120, the first biographic input 112. Biographic parameter module may consult voice recognition table to determine the identification of the user who generated first biographic input 112. This may assist a user in having control over generating commands so that users do not impersonate one another.

Still referring to FIG. 1, language evaluation module 128 may include a natural language process classification model that enumerates and/or derives statistical relationships between input term and output terms. Algorithm to generate language processing model may include a stochastic gradient descent algorithm, which may include a method that iteratively optimizes an objective function, such as an objective function representing a statistical estimation of relationships between terms, including relationships between input terms and output terms, in the form of a sum of relationships to be estimated. In an alternative or additional approach, sequential tokens may be modeled as chains, serving as the observations in a Hidden Markov Model (HMM). HMMs as used herein are statistical models with inference algorithms that that may be applied to the models. In such models, a hidden state to be estimated may include an association between an extracted word categories of user's life events, moments of user's life; events that occurred during user's life, and participants in user's life. There may be a finite number of categories of user's life events, moments of user's life, events that occurred during user's life, and participants in user's life to which an extracted word may pertain; an HMM inference algorithm, such as the forward-backward algorithm or the Viterbi algorithm, may be used to estimate the most likely discrete state given a word or sequence of words. Language evaluation module 128 may combine two or more approaches. For instance, and without limitation, machine-learning program may use a combination of Naive-Bayes (NB), Stochastic Gradient Descent (SGD), and parameter grid-searching classification techniques; the result may include a classification algorithm that returns ranked associations.

Continuing to refer to FIG. 1, generating language processing model may include generating a vector space, which may be a collection of vectors, defined as a set of mathematical objects that can be added together under an operation of addition following properties of associativity, commutativity, existence of an identity element, and existence of an inverse element for each vector, and can be multiplied by scalar values under an operation of scalar multiplication compatible with field multiplication, and that has an identity element is distributive with respect to vector addition, and is distributive with respect to field addition. Each vector in an n-dimensional vector space may be represented by an n-tuple of numerical values. Each unique extracted word and/or language element as described above may be represented by a vector of the vector space. In an embodiment, each unique extracted and/or other language element may be represented by a dimension of vector space; as a non-limiting example, each element of a vector may include a number representing an enumeration of co-occurrences of the word and/or language element represented by the vector with another word and/or language element. Vectors may be normalized, scaled according to relative frequencies of appearance and/or file sizes. In an embodiment associating language elements to one another as described above may include computing a degree of vector similarity between a vector representing each language element and a vector representing another language element; vector similarity may be measured according to any norm for proximity and/or similarity of two vectors, including without limitation cosine similarity, which measures the similarity of two vectors by evaluating the cosine of the angle between the vectors, which can be computed using a dot product of the two vectors divided by the lengths of the two vectors. Degree of similarity may include any other geometric measure of distance between vectors.

With continued reference to FIG. 1, language evaluation module 128 retrieves a key element 132 from a first biographic input 112. A "key element," as used herein, is data, including any numerical, textual, and/or character data, describing, and/or relating to a particular life event of importance and/or significance to a user. A life event may include a category of a user's life, a participant in a user's life, and/or a moment of a user's life. A life even may include a particular time, moment, and/or memory that marked an important or special moment of a user's life such as a day marked with great sadness such as the death of a loved one, or a day marked with great happiness such as the birth of a child or a wedding day. A life event may include an event of monumental importance to a user, that the user feels is more significant than other days or moments in the user's life. Key element 132 may include a day or memory that has significance or importance to the user, and that was noticeably different than other days or times in the user's life. Key element 132 may include a time period of a user's life which may include a specific date such as "Oct. 25, 2005", and/or a description of a time period such as "adolescence" or "$5^{th}$ grade." Key element 132 may include a category of a user's life, which may include a particular time period of a user's life having shared characteristics. Categories may include any of the categories as described above, such as for example categories as separated by age including newborn, toddler, adolescence, pre-teen, teen, young adult, adulthood, middle age, old age, and the like. Categories may include categories separated by school years such as pre-school, kindergarten, elementary school, middle school, high school, college, graduate school, and the like. Categories may include categories such as where a user lived or worked. Key element 132 may include a participant, which may include any of user's network participants who may participate in system 100, and/or any person who has been involved in a user's life. For example, participant may include user's childhood neighbor Kevin, who may also participate within system 100 such as through user network device 124. Participant may not include a network participant, such as when a participant refuses to participate in system 100 or may have predeceased user and as such is unable to participate in system 100. In yet another non-limiting example, participant may live in a remote area of the world and may not be physically able to participate in system 100. In yet another example, user may have lost touch with participant such as a friend from childhood and may not know of participant's contact information to be able to invite participant to partake in system 100. Key element 132 may include a moment of a user's life. Moment may include a particular instance, experience, or event that occurred during a user's life. Moment may include for example, user's wedding day or user's first day of high school. Moment may include for example, user's first kiss, user's first school dance, user's experience with religion, user's trip to Bali and the like.

With continued reference to FIG. 1, biographic parameter module is configured to retrieve an element of stored data 136 relating to a key element 132. An "element of stored data," as used in this disclosure, is data, including any numerical, textual, and/or character data relating to a user. An element of stored data 136 may include a plurality of biographic inputs. For instance and without limitation, an element of stored data 136 may contain a second biographic input 152 generated by a user's friend, a third biographic input generated by a user's co-worker, and a fourth biographic input generated by the user. In an embodiment, an element of stored data 136 may be generated by the same user, and/or a plurality of users. In an embodiment, an element of stored data 136 may related to the same moment or event. In yet another non-limiting example, an element of stored data 136 may relate to multiple moments and/or events. An element of stored data 136 may be contained in a biographic database 140. Biographic database 140 may include any data structure for ordered storage and retrieval of data, which may be implemented as a hardware and/or software module. Biographic database 140 may be implemented, without limitation, as a relational database, a key-value retrieval datastore such as a NOSQL database, or any other format or structure for use as a datastore that a person skilled in the art would recognize as suitable upon review of the entirety of this disclosure.

With continued reference to FIG. 1, biographic parameter module is configured to generate a query utilizing a first biographic input 112 and retrieve an element of stored data 136 utilizing the query. A "query," as used in this disclosure, is any datum utilized to retrieve an element of stored data 136. A query may be utilized to retrieve an element of stored data 136 such as by inputting a query into a data structure, database, and/or model, and receiving a corresponding output, such as an element of stored user data. Biographic parameter module may generate a query by extracting one or more words, phrases, and/or sentences contained within a first biographic input 112. Biographic parameter module may generate a query utilizing one or more words, phrases, and/or sentences contained within a key element 132. A query may relate to a category of biographic inputs, including any of the categories as described herein. For example, a category may include groupings of certain time period or moments in a user's life such as the moments leading up to and including a user's sixteenth birthday. A category may relate to emotional state of a user's life, such as moments that were celebratory and happy for the user, or moments that were met with great upset and defeat. A query may relate to a participant, including any of the participants described herein. A participant may include family, friends, acquittances, co-workers, colleagues, and the like. Biographic parameter module retrieves an element of stored data 136 utilizing a query from biographic database 140.

With continued reference to FIG. 1, biographic parameter module is configured to classify a first biographic input 112 to a life theme 144 using a first classification algorithm. A classification algorithm, defined as a process whereby biographic parameter module derives, from training data, a model known as a "classifier," for sorting inputs into categories or bins of data. A first classification algorithm utilizes a first biographic input 112 as an input, and outputs a life theme 144. Classifier is trained using training data from sources that may include but are not limited to records of previous iterations of classifier, user inputs and/or questionnaire responses, expert inputs, and the like. Computing device 104 trains classifier using training data, including any of the training data as described herein. Classification may be performed using, without limitation, linear classifiers such as without limitation logistic regression and/or naive Bayes classifiers, nearest neighbor classifiers such as k-nearest neighbors classifiers, support vector machines, least squares support vector machines, fisher's linear discriminant, quadratic classifiers, decision trees, boosted trees, random forest classifiers, learning vector quantization, and/or neural network-based classifiers. A "life theme," as used in this disclosure, is any subject, and/or topic of discourse in a user's life. A life theme 144 may relate to a particular time period in a user's life, such as a user's teenage years, or adolescent years. A life theme 144 may relate to a particular event, such as Christmas Day 1976. A life theme 144 may relate to a block of time that was significant to a user, such as a time of mourning after the passing of a friend or family member. Biographic parameter module retrieves an element of stored data 136 relating to a life theme 144. For example, biographic parameter module may match a life theme 144 to stored data that matches the life theme 144. For instance and without limitation, a life theme 144 that relates to a user's thirtieth birthday party may be utilized to retrieve an element of data related to the user's thirtieth birthday party. In an embodiment, elements of data may be stored in biographic database 140 and may be organized according to life theme 144 as described below in more detail.

With continued reference to FIG. 1, system 100 includes a chaining module 148. Chaining module 148 may include any suitable hardware or software module. Chaining module 148 is configured to receive a first biographic input 112 and an element of stored data 136 from biographic parameter module. Chaining module 148 may receive first biographic input 112 and an element of stored data 136 from biographic parameter module utilizing any network methodology as described herein.

With continued reference to FIG. 1, chaining module 148 is configured to evaluate a first biographic input 112 and an element of stored data 136 to determine a relation between the first biographic input 112 and the element of stored data 136. A "relation," as used in this disclosure, is any shared commonality between a first biographic input 112 and/or an element of stored data 136. A shared commonality may include if they both relate to the same life theme 144, they are generated by the same person, they describe events that historically took place around the same time as one another, they both relate to the same event or memory, and the like. For instance and without limitation, chaining module 148 may evaluate a first biographic input 112 and an element of stored data 136 and determine that both the first biographic input 112 and the element of stored data 136 both describe the same life event, specifically the user's tenth wedding anniversary. A relation may be determined by classifying a first biographic input to a life theme and classifying an element of stored data to a life theme to determine if the life themes match and/or are related to one another. Classification may be performed utilizing any of the methodologies as described herein.

With continued reference to FIG. 1, chaining module 148 is configured to generate a request for a second biographic input 152 as a function of a first biographic input 112 and an element of stored data 136. A "second biographic input," as used in this disclosure, includes any input suitable for use as first biographic input 112. Second biographic input 152 may include a description, report, story, tale, statement, explanation, interpretation, account, portrayal, reflection, summary, answer to a question, photograph, video, and/or combination of any of the above describing a user's life. Second biographic input 152 may relate to first biographic input 112. For example, a first biographic input 112 describing a user's experience on the tennis team during high school may cause chaining module 148 to generate at least a request for a second biographic input 152 to include more information pertaining to user's experience on the tennis team. This may include for example, generating at least a request for a second biographic input 152 that includes more information from user about certain matches or trophies user may have won, generating at least a request for a second biographic input 152 to another member of user's high school tennis team, and/or generating at least a request for a second biographic input 152 to user's high school coach. In an embodiment, first biographic datum may be combined with second biographic datum and other biographic datums to compile a book, magazine, e-flip book, e-version of magazine and the like. In such an instance, a user may be able to refer back and add or edit biographic datums as more events transpire and occur.

With continued reference to FIG. 1, chaining module 148 may generate at least a request for a second biographic input 152 as a function of key element 132. For example, a key element 132 that includes a description of a moment such as user's wedding, may cause chaining module 148 to generate at least a request for a second biographic input 152 that includes a description of user's honeymoon or first year of marriage. In yet another example, a key element 132 that mentions a particular participant, such as Christmas dinner with user's immediate family in 1999 may cause chaining module 148 to generate at least a request for a second biographic input 152 to user's network of participants who may have been present at Christmas dinner in 1999.

With continued reference to FIG. 1, chaining module 148 may be configured to generate a biographic learner 156, wherein the biographic learner 156 learns user milestones by evaluating biographic inputs relating to a user, using a machine-learning process 160. Computing device 104 may perform determinations, classification, and/or analysis steps, methods, processes, or the like as described in this disclosure using machine learning processes. A "machine learning process," as used in this disclosure, is a process that automatedly uses a body of data known as "training data" and/or a "training set" to generate an algorithm that will be performed by a computing device/module to produce outputs given data provided as inputs; this is in contrast to a non-machine learning software program where the commands to be executed are determined in advance by a user and written in a programming language." "Training data," as used in this disclosure, is any sample data, utilized to build and/or train any machine-learning process, including any machine-learning model, machine-learning algorithm, and the like. Training data includes a dataset of examples that can be used for learning, to fit certain parameters. Biographic learner 156 may be implemented as any machine-learning process 160 as described herein. A "user milestone," as used in this disclosure, is any event that occurs to a user throughout a user's life that is of heightened significance and/or importance to the user. A user milestone may occur on a single day, such as a user's wedding day. A user milestone may occur over a specified period of time, such as the time throughout the pregnancy of a user's first child. Chaining module 148 may learn user milestones such as by evaluating a life theme 144. For example, biographic database 140 may contain information regarding user milestones that include a user's wedding, a user's first job, a user's divorce, and a user's dating history after the user's divorce. In such an instance, chaining module 148 may evaluate biographic inputs utilizing biographic learner 156 and identify user milestones that have not been identified or discussed, including the user's childhood and adolescence, the user's thirtieth birthday party, the user's past Christmas, and the like. Such information may be utilized to generate a request for a second biographic input 152 as described below in more detail. Chaining module 148 creates a milestone label for a first biographic input 112 and an element of stored data 136. A "milestone label," as used in this disclosure, is data describing and/or characterizing a milestone relating to a first biographic input 112 and an element of stored data 136. A milestone label may describe a milestone contained within a first biographic input 112 and an element of stored data 136. For instance and without limitation, a milestone label may contain a description of a milestone of "Christmas Day 1999" for a first biographic input 112 and an element of stored data 136 that both describe events that occurred on Christmas day 1999.

Still referring to FIG. 1, computing device 104 may be designed and configured to create a machine-learning model using techniques for development of linear regression models. Linear regression models may include ordinary least squares regression, which aims to minimize the square of the difference between predicted outcomes and actual outcomes according to an appropriate norm for measuring such a difference (e.g. a vector-space distance norm); coefficients of the resulting linear equation may be modified to improve minimization. Linear regression models may include ridge regression methods, where the function to be minimized includes the least-squares function plus term multiplying the square of each coefficient by a scalar amount to penalize large coefficients. Linear regression models may include least absolute shrinkage and selection operator (LASSO) models, in which ridge regression is combined with multiplying the least-squares term by a factor of 1 divided by double the number of samples. Linear regression models may include a multi-task lasso model wherein the norm applied in the least-squares term of the lasso model is the Frobenius norm amounting to the square root of the sum of squares of all terms. Linear regression models may include the elastic net model, a multi-task elastic net model, a least angle regression model, a LARS lasso model, an orthogonal matching pursuit model, a Bayesian regression model, a logistic regression model, a stochastic gradient descent model, a perceptron model, a passive aggressive algorithm, a robustness regression model, a Huber regression model, or any other suitable model that may occur to persons skilled in the art upon reviewing the entirety of this disclosure. Linear regression models may be generalized in an embodiment to polynomial regression models, whereby a polynomial equation (e.g. a quadratic, cubic or higher-order equation) providing a best predicted output/actual output fit is sought; similar methods to those described above may be applied to minimize error functions, as will be apparent to persons skilled in the art upon reviewing the entirety of this disclosure.

Continuing to refer to FIG. 1, machine-learning algorithms may include, without limitation, linear discriminant analysis. Machine-learning algorithm may include quadratic discriminate analysis. Machine-learning algorithms may include kernel ridge regression. Machine-learning algorithms may include support vector machines, including without limitation support vector classification-based regression processes. Machine-learning algorithms may include stochastic gradient descent algorithms, including classification and regression algorithms based on stochastic gradient descent. Machine-learning algorithms may include nearest neighbors algorithms. Machine-learning algorithms may include Gaussian processes such as Gaussian Process Regression. Machine-learning algorithms may include cross-decomposition algorithms, including partial least squares and/or canonical correlation analysis. Machine-learning algorithms may include naïve Bayes methods. Machine-learning algorithms may include algorithms based on decision trees, such as decision tree classification or regression algorithms. Machine-learning algorithms may include ensemble methods such as bagging meta-estimator, forest of randomized tress, AdaBoost, gradient tree boosting, and/or voting classifier methods. Machine-learning algorithms may include neural net algorithms, including convolutional neural net processes.

Still referring to FIG. 1, models may be generated using alternative or additional artificial intelligence methods, including without limitation by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning. This network may be trained using training data.

Still referring to FIG. 1, machine-learning algorithms may include supervised machine-learning algorithms. Supervised machine learning algorithms, as defined herein, include algorithms that receive a training set relating a number of inputs to a number of outputs, and seek to find one or more mathematical relations relating inputs to outputs, where each of the one or more mathematical relations is optimal according to some criterion specified to the algorithm using some scoring function. For instance, a supervised learning algorithm may include [input examples] as described above as inputs, [output examples] as outputs, and a scoring function representing a desired form of relationship to be detected between inputs and outputs; scoring function may, for instance, seek to maximize the probability that a given input and/or combination of elements inputs is associated with a given output to minimize the probability that a given input is not associated with a given output. Scoring function may be expressed as a risk function representing an "expected loss" of an algorithm relating inputs to outputs, where loss is computed as an error function representing a degree to which a prediction generated by the relation is incorrect when compared to a given input-output pair provided in training data. Persons skilled in the art, upon reviewing the entirety of this disclosure, will be aware of various possible variations of supervised machine learning algorithms that may be used to determine relation between inputs and outputs.

With continued reference to FIG. 1, supervised machine-learning processes 160 may include classification algorithms, defined as processes whereby a computing device derives, from training data, a model for sorting inputs into categories or bins of data. Classification may be performed using, without limitation, linear classifiers such as without limitation logistic regression and/or naive Bayes classifiers, nearest neighbor classifiers, support vector machines, decision trees, boosted trees, random forest classifiers, and/or neural network-based classifiers.

Still referring to FIG. 1, machine learning processes may include unsupervised processes. An unsupervised machine-learning process 160, as used herein, is a process that derives inferences in datasets without regard to labels; as a result, an unsupervised machine-learning process 160 may be free to discover any structure, relationship, and/or correlation provided in the data. Unsupervised processes may not require a response variable; unsupervised processes may be used to find interesting patterns and/or inferences between variables, to determine a degree of correlation between two or more variables, or the like.

Still referring to FIG. 1, machine-learning processes 160 as described in this disclosure may be used to generate machine-learning models. A machine-learning model, as used herein, is a mathematical representation of a relationship between inputs and outputs, as generated using any machine-learning process 160 including without limitation any process as described above, and stored in memory; an input is submitted to a machine-learning model once created, which generates an output based on the relationship that was derived. For instance, and without limitation, a linear regression model, generated using a linear regression algorithm, may compute a linear combination of input data using coefficients derived during machine-learning processes 160 to calculate an output datum. As a further non-limiting example, a machine-learning model may be generated by creating an artificial neural network, such as a convolutional neural network comprising an input layer of nodes, one or more intermediate layers, and an output layer of nodes. Connections between nodes may be created via the process of "training" the network, in which elements from a training dataset are applied to the input nodes, a suitable training algorithm (such as Levenberg-Marquardt, conjugate gradient, simulated annealing, or other algorithms) is then used to adjust the connections and weights between nodes in adjacent layers of the neural network to produce the desired values at the output nodes. This process is sometimes referred to as deep learning.

With continued reference to FIG. 1, a lazy-learning process and/or protocol, which may alternatively be referred to as a "lazy loading" or "call-when-needed" process and/or protocol, may be a process whereby machine learning is conducted upon receipt of an input to be converted to an output, by combining the input and training set to derive the algorithm to be used to produce the output on demand. For instance, an initial set of simulations may be performed to cover an initial heuristic and/or "first guess" at an output and/or relationship. As a non-limiting example, an initial heuristic may include a ranking of associations between inputs and elements of training data. Heuristic may include selecting some number of highest-ranking associations and/or training data elements. Lazy learning may implement any suitable lazy learning algorithm, including without limitation a K-nearest neighbors algorithm, a lazy naïve Bayes algorithm, or the like; persons skilled in the art, upon reviewing the entirety of this disclosure, will be aware of various lazy-learning algorithms that may be applied to generate outputs as described in this disclosure, including without limitation lazy learning applications of machine-learning algorithms as described in further detail below.

With continued reference to FIG. 1, chaining module 148 utilizes a milestone label to generate a request for a second biographic input 152. For instance and without limitation, chaining module 148 may utilize a milestone label to find out more information about a milestone contained within a milestone label, and/or to capture input from another friend or family member about a particular milestone. In yet another non-limiting example, chaining module 148 may utilize a milestone label to examine other milestone labels and evaluate what milestone labels may be lacking information and/or details and may require more information. Chaining module 148 may generate a second biographic input 152 to obtain more information about milestone labels that don't exist and/or that require more information. For instance and without limitation, chaining module 148 may determine that a milestone such as any memories relating to a user's twenty first birthday do not exist. In such an instance, chaining module 148 may generate a request for a second biographic input 152 for a user's childhood friend who was at user's twenty first birthday party, to obtain more information from the user's friend about the twenty first birthday party. Chaining module 148 transmits a request for a second biographic input 152 to a user network device. This may be performed utilizing any network methodology as described herein.

With continued reference to FIG. 1, chaining module 148 is configured to chain a first biographic input 112 and an element of stored data 136. To "chain," as used in this disclosure, is to order a first biographic input 112 and an element of stored data 136 in a narrative and/or temporal order. A chain may include a temporal sequence of a plurality of biographic inputs. A chain, may include storing a first biographic input 112 and an element of stored data 136 together, as one data entry. A chain may include data entries that relate to one another, such as by relating to the same milestone label and/or life theme 144. A chain may be lengthened such as by adding other elements of stored data that are linked to a first biographic input 112 and an element of stored data 136. A chain may be lengthened by adding a second biographic input 152.

With continued reference to FIG. 1, chaining module 148 is configured to receive a second biographic input 152 from a user network device. This may be performed utilizing any network methodology as described herein. Chaining module 148 chains a second biographic input 152 to a first biographic input 112. This may be performed utilizing any methodologies as described herein.

With continued reference to FIG. 1, chaining module 148 may select a user network device as a function of matching the at least a first biographic datum to a user network device. This may include for example, matching a key element 132 to a user network device. For example, a key element 132 that contains a specific participant may include matching the specific participant to a user network device. In an embodiment, a key element 132 that contains a specific participant who may not participate in system 100 may include matching to a friend or family member of the specific participant who does participate in system 100. For example, a first biographic datum containing a key element 132 such as user's childhood best friend Susan, may be matched to a user network device operated by Susan; however if Susan does not participate in system 100, then key element 132 that mentions Susan may be matched to a user network device operated by Susan's Mom or Susan's sister Betty who was also knew user during childhood and who participates in system 100. In yet another non-limiting example, a key element 132 that includes a category such as early adulthood may include matching early adulthood to other participants who may have known user during early adulthood. In yet another non-limiting example, a category such as college may include matching college to other participants who went to user's college and/or participated in similar activities or classes as user. Matching may include matching a key element 132 such as a moment to other participants who may have been present or participated in the moment. For example, a moment such as user's divorce may be matched to divorce attorneys, judges, and paralegals who may have been present the day the divorce decree was finalized in court. Matching may be performed by any of the methodologies as described below in reference to FIG. 2.

Figure 2:
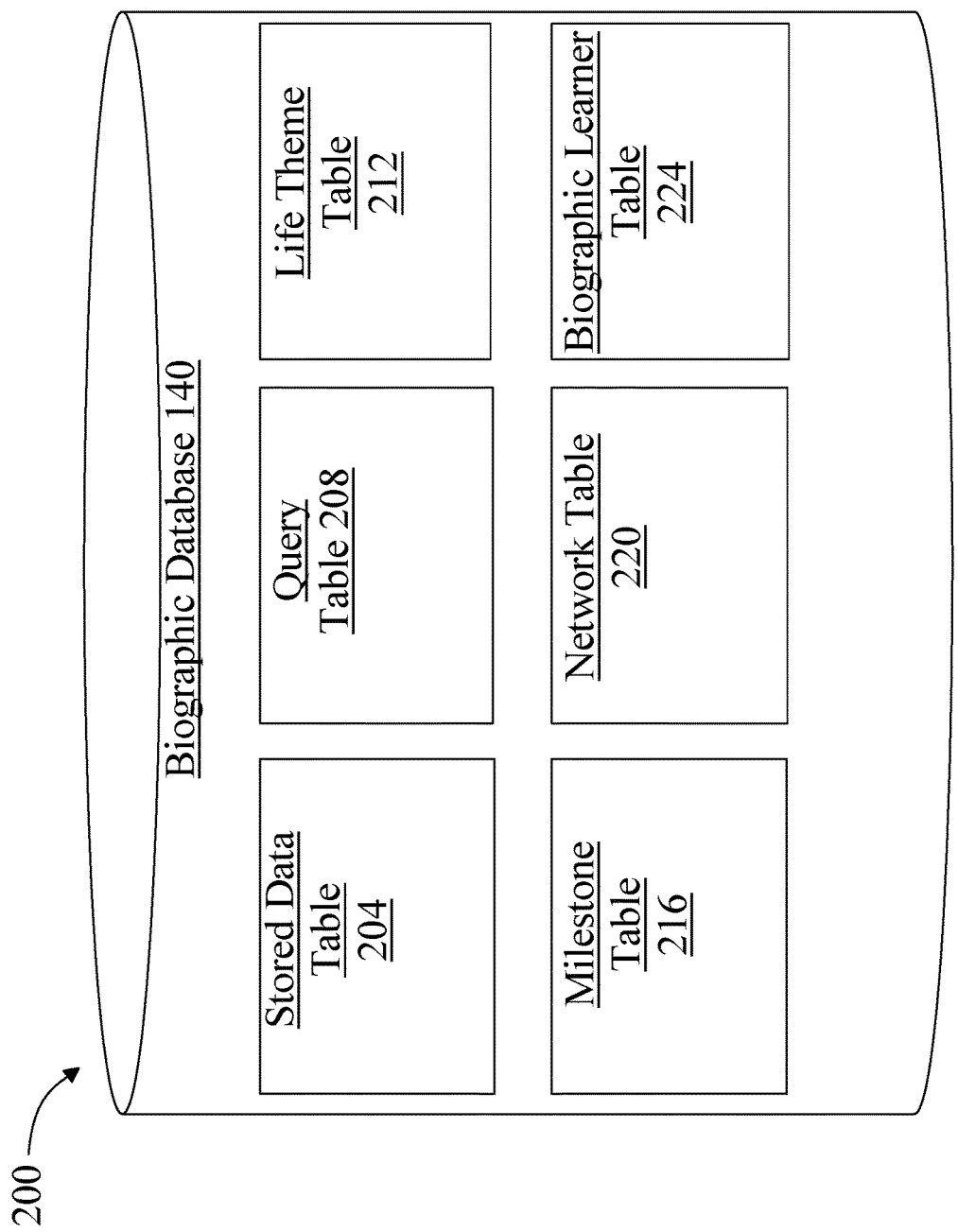
FIG. 2 is a block diagram illustrating an exemplary embodiment of a biographic database.

Referring now to FIG. 2, an exemplary embodiment 200 of a biographic database is illustrated. Biographic database may be implemented as any data structure as described above in more detail in reference to FIG. 1. One or more tables contained within biographic database 140 may include stored data table 204; stored data table 204 may include one or more elements of stored data relating to a user. One or more tables contained within biographic database 140 may include query table; query table may include one or more queries utilizing to retrieve data from biographic database. One or more tables contained within biographic database 140 may include life theme table 212; life theme table 212 may include one or more life themes relating to a user. One or more tables contained within biographic database 140 may include milestone table 216; milestone table 216 may include one or more milestone labels relating to a user. One or more tables contained within biographic database 140 may include network table 220; network table 220 may include one or more members of a user's network including family members, friends, acquaintances, co-workers, and the like. One or more tables contained within biographic database 140 may include biographic learner table 224; biographic learner table 224 may include one or more machine-learning processes utilized to generate biographic learner.

Figure 3:
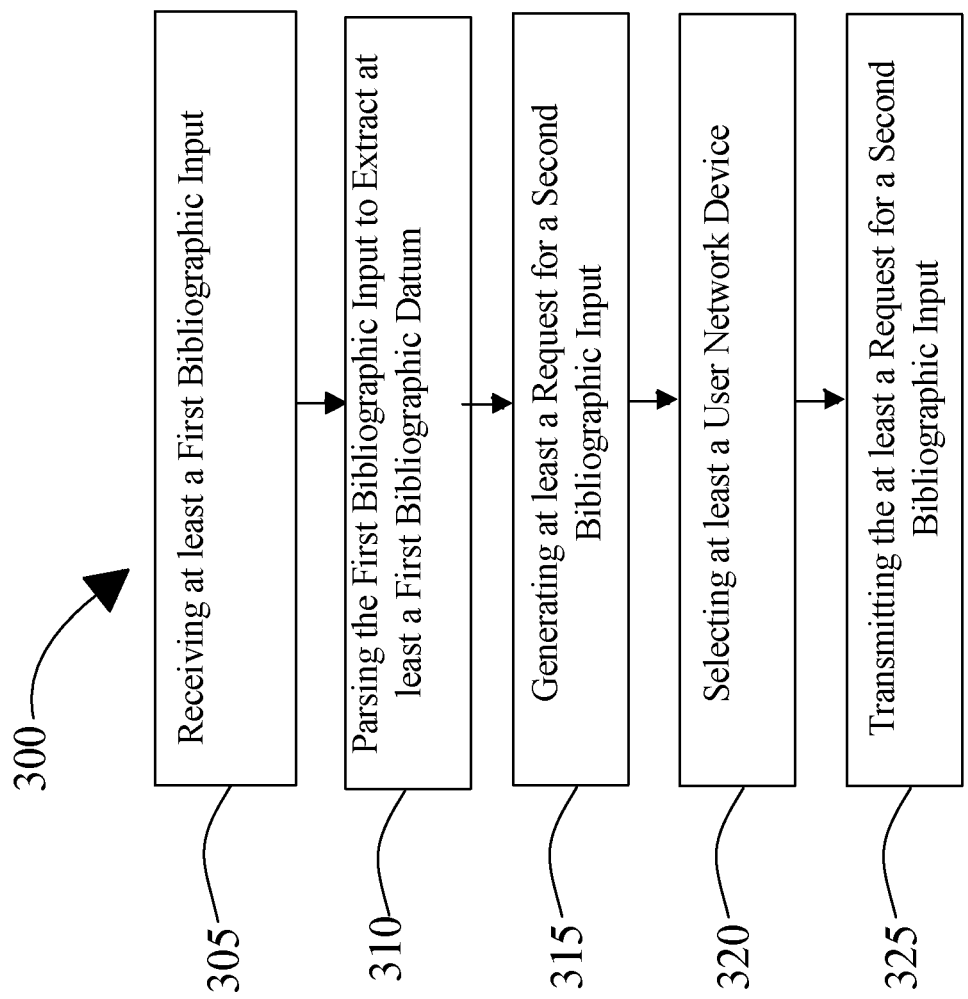
FIG. 3 is a process flow diagram of an exemplary embodiment of a method of self-evaluation.

Referring now to FIG. 3, an exemplary embodiment of a method 300 of self-evaluation is illustrated. At step 305 computing device 104 receives a first biographic input 112. Receiving may be performed over a network, such as by any of the network methodologies as disclosed herein. The computing device 104 may receive a first biographic input 112 from a user device 116. User device 116 may include any of the devices as described above in reference to FIG. 1. In an embodiment, a first biographic input 112 received from user device 116 may pertain to user. For example, first biographic input 112 from user device 116 may describe user's twenty first birthday party. In an embodiment, a first biographic input 112 received from user device 116 may not pertain to user but rather may pertain to a family member, friend, acquittance, coworker, or neighbor or user. For example, first biographic input 112 form user device 116 may describe user's grandmother's $95^{th}$ birthday party. While user may have been present at the $95^{th}$ birthday party, first biographic input 112 from user device 116 may focus more on event as it pertains to user's grandmother. The computing device 104 may receive a first biographic input 112 from a user network device 124. User network device 124 may include any of the devices as described above in reference to FIG. 1. In an embodiment, a first biographic input 112 received from user network device 124 may pertain to user's network participant. For example, a first biographic input 112 received from user network device 124 may describe user network participant's first childhood love interest. In an embodiment, a first biographic input 112 received from user network device 124 may not pertain to user network participant, but rather may pertain to somebody else. For example, first biographic input 112 received from user network device 124 may described user's first childhood love interest.

With continued reference to FIG. 3, at step 310 the computing device 104 parses the a first biographic input 112 to extract at least a first biographic datum. Parsing may be performed by any of the methodologies as described above in reference to FIG. 1. Parsing may be performed for example, by language evaluation module 128. Parsing may be performed by language evaluation module 128 to detect a key element 132. Key element 132 may include any of the key element 132 as described above including a category, a participant, and/or a moment. Category may include any of the categories as described above. Participant may include any of the participants as described above. Moments may include any of the moments as described above.

With continued reference to FIG. 3, at step 315, the computing device 104 generates at least a request for a second biographic input 152 as a function of the at least a first biographic datum. At least a request for a second biographic input 152 may be generated for example, when a first biographic datum is incomplete, contains sparse information, and/or may require further elaboration or points of view. For example, a first biographic datum that describes a moment such as user's high school graduation may cause a request for a second biographic input 152 to be generated for example from the point of view of user's family members who may have attended the graduation and watched from the stands. In yet another non-limiting example, a first biographic datum that describes user's first communion may cause a request for a second biographic input 152 to be generated for example because it happened when user was so young and contains missing and/or an incomplete description of the event. At least a request for a second biographic input 152 may be generated as a function of a key element 132. For example, language evaluation module 128 may detect a key element 132 such as a category of user's life such as adulthood and describing user's first job after college. At least a request for a second biographic input 152 may be generated for example to collet other descriptions as to user's adulthood such as user's first home purchased during adulthood, user's first car purchased during adulthood and/or user's favorite foods during adulthood. At least a request for a second biographic input 152 may be generated as a function of a key element 132 such as a participant contained within at least a first biographic datum. For example, at least a first biographic datum that mentions user's high school girlfriend may cause at least a request for a second biographic input 152 to be generated to user's high school girlfriend. In such an instance, if a participant such as user's high school girlfriend cannot be located, then at least a request for a second biographic input 152 may be generated to another participant who may have known both user and user's high school girlfriend. This could include for example, user's high school girlfriend's best friend or user's high school girlfriend's parents or siblings. At least a request for a second biographic input 152 may be generated as a function of a key element 132 such as a moment. For example, at least a first biographic datum that contains a key moment describing the death of user's sibling may cause at least a request for a second biographic input 152 to be generated that may describe user's sibling's funeral or the days following user's sibling's death.

With continued reference to FIG. 3, at step 320, the computing device 104 selects at least a user network device as a function of the at least a first biographic datum. Selecting may be performed by matching the at least a first biographic datum to a user network device. Matching may include for example, matching an input of at least a first biographic datum to an output that constitutes a user network participant. Matching may be learned through a machine learning process. For example, information concerning a first biographic datum that contains a mention of a sibling such as a brother or sister may be matched to a user network participant that includes sibling of user. In yet another example, a first biographic datum that contains a mention of a friend may be matched to a user network participant that includes a friend of user. Matching may include for example, matching an input containing a key element 132 to an output containing a user network participant. Matching may be learned through a machine learning process such as by utilizing language evaluation module 128. For example, a key element 132 that comprises a category such as elementary school may be matched to an output containing a user network participant that was enrolled in the same elementary school at the same time as user. A key element 132 that comprises a participant such as user's grandmother may be matched to an output containing a user network participant that includes user's grandmother. In an embodiment, if a user network participant does not participate in system 100 or may be unavailable or deceased, a user network participant with some relationship to the unavailable user network participant may be selected. For example, if a user network participant such as user's grandmother is deceased, then grandmother's spouse may be selected instead. In yet another non-limiting example, if a user network participant includes user's first boss from user's first job, but user's first boss is unwilling to participate, then coworkers from user's first job or a manager from user's first job may be selected. A key element 132 that comprises a moment may be matched to an output containing others who may have been present or participated in the moment. For example, a moment such as a user's college experience may be matched to an output containing other users who attended the same college as user and at the same time. In an embodiment, user device 116 may be selected such as when a first biographic input 112 and/or first biographic datum may need further explanation and/or elaboration. For example, a first biographic input 112 that contains only a few short sentences and/or explanation may be selected to user device 116 to provide further details and/or to ask more questions surrounding first biographic input 112. In such an instance, GRAPHICAL USER INTERFACE 120 may prompt user with more questions pertaining to a first biographic input 112. Questions may seek to obtain further clarification and/or emotions as to how user felt about a certain event or moment in user's life or another's life. This may allow for self-evaluation as user can reflect on moments contained within first biographic input 112 and evaluate user's life.

With continued reference to FIG. 3, at step 325 the computing device 104 transmits the at least a request for a second biographic input 152 to the user network device. Transmitting may include electronic transmissions such as transmissions over the internet. Transmitting may be implemented, without limitation, utilizing any machinery as described herein.

Figure 4:
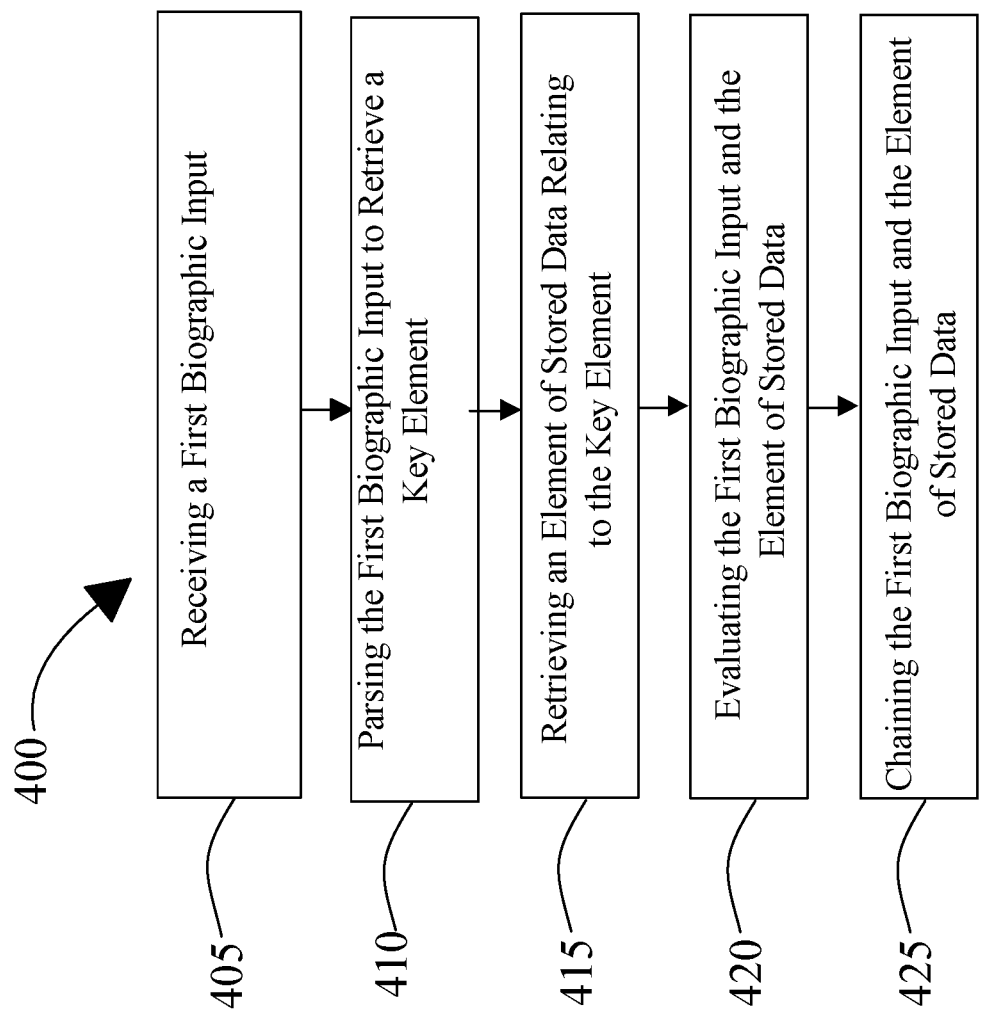
FIG. 4 is a process flow diagram of an exemplary embodiment of a method of chaining biographic inputs using artificial intelligence.

Referring now to FIG. 4, an exemplary embodiment 400 of a method of chaining biographic inputs using artificial intelligence is illustrated. At step 405, computing device 104 receives a first biographic input 112. A first biographic input 112 includes any of the biographic inputs as described above in more detail in reference to FIG. 1. Computing device 104 receives a first biographic input 112 utilizing any network methodology as described herein. A first biographic input 112 identifies a user. A first biographic input 112 may be received from a user device, such as when a user may generate a first biographic input 112 and transmit the first biographic input 112 to computing device 104. A first biographic input 112 may be received from a user network device, including any of the user network devices as described above in more detail in reference to FIG. 1. For instance and without limitation, a first biographic input 112 may be received from a user device and contain a description of the moment a user's graduated from high school and how the user felt in that moment. In yet another non-limiting example, a first biographic input 112 may be received from a user network device and may be generated by a childhood friend of the user and may describe the joint graduation party the user and the user's friend had when they graduated from high school.

With continued reference to FIG. 4, at step 410 computing device 104 parses a first biographic input 112 to retrieve a key element 132. Computing device 104 parses a first biographic input 112 utilizing any of the methodologies as described above in more detail in reference to FIG. 1. A key element 132 describes and/or relates to a particular life event. For instance and without limitation, a key element 132 may include a particular life event such as signing a lease for an apartment that the user lived alone without any parents, siblings, roommates, boyfriend, and/or girlfriend. In yet another non-limiting example, a key element 132 may include a time when a user did something that terrified the user, such as skydiving or signing up for an acting class and performing in a theater production.

With continued reference to FIG. 4, at step 415 computing device 104 retrieves an element of stored data 136 relating to a key element 132. An element of data includes any of the elements of data as described above in more detail in reference to FIG. 1. An element of stored data 136 includes a plurality of biographic inputs. In an embodiment, a plurality of biographic inputs may be stored in biographic database 140. Computing device 104 generates a query utilizing a first biographic input 112. A query includes any of the queries as described above in more detail in reference to FIG. 1. In an embodiment, a query may relate to a category contained within a first biographic input 112. For example, a category may include a user's adolescence years. In yet another non-limiting example, a category may include a period of time while the user was in high school. In an embodiment, a query may relate to a participant, such as a family member, friend, acquittance, and the like as described above in more detail in reference to FIG. 1. Computing device 104 generates a query utilizing any of the methodologies as described above in more detail in reference to FIG. 1. Computing device 104 retrieves an element of stored data 136 utilizing a query. For instance and without limitation, a query relating to a high school play that a user was the lead character in, may be utilized to retrieve an element of stored data 136 relating to the high school play that the user was involved in from biographic database 140. In an embodiment, entries contained within biographic database 140 may be stored and/or sort according to various key element 132 as described above in more detail in reference to FIGS. 1 and 2.

With continued reference to FIG. 4, computing device 104 may retrieve an element of stored data 136 by classifying a first biographic input 112 to a life theme 144 using a first classification algorithm. A first classification algorithm includes any of the classification algorithms as described above in more detail in reference to FIG. 1. For example, a first classification algorithm may include a linear classifier such as logistic regression, Naïve Bayes, k-nearest neighbor, decision tree, random forest, and/or boosted tree. A life theme 144 includes any of the life theme 144 as described above in more detail in reference to FIG. 1. For instance and without limitation, a life theme 144 may relate to a subject of discourse in a user's life, such as various charitable donations a user has made throughout the user's life, or various vacations the user has taken over the course of the user's life. Computing device 104 utilizes a first biographic input 112 as an input to a classifier, and outputs a life theme 144. Computing device 104 utilizes a life theme 144 to retrieve an element of stored data 136 relating to the life theme 144. In an embodiment, elements of data may be stored within biographic database 140 according to various life theme 144.

With continued reference to FIG. 4, at step 420, computing device 104 evaluates a first biographic input 112 and an element of stored data 136 to determine a relation between the first biographic input 112 and the element of stored data 136. Evaluating a relation includes determining a commonality between a first biographic input 112 and/or an element of stored data 136. A commonality may include determining if a first biographic input 112 and an element of stored data 136 relate to a key element 132. For instance and without limitation, computing device 104 may determine that a first biographic input 112 describing a user's honeymoon to Hawaii, shares a commonality with an element of stored data 136 describing the user's wedding, as both relate to the time period of the user's life when the user was getting married. A commonality may include determining if a first biographic input 112 and an element of stored data 136 were generated by the same user. For instance and without limitation, computing device 104 may evaluate a first biographic input 112 generated from a user network device operated by a user's sister, and an element of stored data 136 generated by the user's sister. A commonality may include evaluating a first biographic input 112 and an element of stored user data to determine if both relate to the same life theme 144. For instance and without limitation, computing device 104 may determine that a first biographic input 112 relates to a user's journey to lose a significant amount of weight, and an element of stored user data contains a specific memory of an exercise program that a user engaged in to lose the weight.

With continued reference to FIG. 4, computing device 104 may evaluate a first biographic input 112 by generating a biographic learner 156. Biographic learner 156 includes any of the biographic learner 156 as described above in more detail in reference to FIG. 1. Biographic learner 156 may be implemented as any machine-learning process 160, as described above in more detail in reference to FIG. 1. Biographic learner 156 learns user milestones by evaluating biographic inputs relating to a user using a machine-learning process 160. Biographic learner 156 may evaluate first biographic input 112, and/or any biographic inputs stored within biographic database 140. Biographic learner 156 may review milestone labels to determine if first biographic input 112 and/or an element of stored data 136 relate to milestone labels, and what milestone labels are missing and/or need more information and/or more biographic inputs to provide more information. For instance and without limitation, biographic learner 156 may determine that a milestone such as a user's thirtieth birthday contains a lot of information, while a milestone such as a user's twenty first birthday contains very little information. Biographic learner 156 creates milestone labels for a first biographic input 112 and an element of stored data 136 to label milestones. Computing device 104 evaluates milestone labels to determine and examine milestone labels that may not exist and/or may need more information. For instance and without limitation, computing device 104 may determine that milestone labels describing any trips, travel, and/or vacations that a user has taken over the previous five years do not exist, while milestone labels describing trips, travel, and/or vacations the user has taken ten years prior do exist. In such an instance, computing device 104 may create a milestone label for a first biographic input 112 and an element of stored data 136 relating to a vacation the user took ten years previously, and generate a request for a second biographic input 152 to find out more information relating to any trips, travel, and/or vacations the user took over the previous five years. Computing device 104 transmits a request for a second biographic input 152 to a user network device, utilizing any network methodology as described herein.

With continued reference to FIG. 4, computing device 104 generates a request for a second biographic input 152 as a function of a first biographic input 112 and an element of stored data 136. A request for a second biographic input 152 includes any of the requests for a second biographic input 152 as described above in more detail in reference to FIG. 1. Computing device 104 generates a request for a second biographic input 152 based on information contained and/or not contained within a first biographic input 112 and an element of stored data 136. For instance and without limitation, computing device 104 may evaluate a first biographic input 112 and an element of stored data 136, and determine that both the first biographic input 112 and the element of stored data 136 were generated by the user's mother, and describe the user's childhood growing up in Montana. In such an instance, computing device 104 may generate a request for a second biographic input 152 to obtain more information regarding the user's childhood growing up in Montana from the perspective of the user's siblings. Computing device 104 generates a request for a second biographic input 152 by evaluating other stored biographic inputs contained within biographic database 140, to determine other users who may contribute to and/or generate a second biographic input 152, and/or particular milestones and/or life theme 144 that may need to have biographic input generated. Computing device 104 generates a request for a second biographic input 152 based on users who may have contributed in the past, users who may have been present and/or participated in certain milestones with the user and the like. Computing device 104 may utilize a milestone label to generate a request for a second biographic input 152. For example, computing device 104 may utilize a milestone label to generate a second biographic input 152 to find out more information about the milestone label. In yet another non-limiting example, computing device 104 may utilize a milestone label to generate a second biographic input 152 to learn more about other milestones in the user's life and/or to find out more information regarding other key element 132 and/or life theme 144.

With continued reference to FIG. 4, at step 425, computing device 104 chains a first biographic input 112 and an element of stored data 136. Chaining includes linking a first biographic input 112 with an element of stored data 136. Linking may include storing a first biographic input 112 and an element of stored data 136 together in biographic database 140. In an embodiment, a first biographic input 112 and an element of stored data 136 may be chained together and compiled into a book, magazine, e-flip book, e-version of magazine and the like. In such an instance, a user may be able to refer back and add or edit biographic inputs as more events transpire and occur and chain on subsequent biographic inputs to create further chapters and/or discussions about a user's life. In an embodiment, a chain may be lengthened such as by adding subsequent biographic inputs and/or elements of stored data. In an embodiment, a chain may contain a plurality of biographic inputs and/or a plurality of elements of stored data that may be generated by a user, and/or a family member, friend, acquittance, and/or co-worker of the user. Computing device 104 receives a second biographic input 152 from a user network device. This may be performed utilizing any network methodology as described herein. Computing device 104 chains a second biographic input 152 to a first biographic input 112. This may be performed utilizing any network methodology as described herein.

It is to be noted that any one or more of the aspects and embodiments described herein may be conveniently implemented using one or more machines (e.g., one or more computing devices that are utilized as a user computing device for an electronic document, one or more server devices, such as a document server, etc.) programmed according to the teachings of the present specification, as will be apparent to those of ordinary skill in the computer art. Appropriate software coding can readily be prepared by skilled programmers based on the teachings of the present disclosure, as will be apparent to those of ordinary skill in the software art. Aspects and implementations discussed above employing software and/or software modules may also include appropriate hardware for assisting in the implementation of the machine executable instructions of the software and/or software module.

Such software may be a computer program product that employs a machine-readable storage medium. A machine-readable storage medium may be any medium that is capable of storing and/or encoding a sequence of instructions for execution by a machine (e.g., a computing device) and that causes the machine to perform any one of the methodologies and/or embodiments described herein. Examples of a machine-readable storage medium include, but are not limited to, a magnetic disk, an optical disc (e.g., CD, CD-R, DVD, DVD-R, etc.), a magneto-optical disk, a read-only memory "ROM" device, a random access memory "RAM" device, a magnetic card, an optical card, a solid-state memory device, an EPROM, an EEPROM, and any combinations thereof. A machine-readable medium, as used herein, is intended to include a single medium as well as a collection of physically separate media, such as, for example, a collection of compact discs or one or more hard disk drives in combination with a computer memory. As used herein, a machine-readable storage medium does not include transitory forms of signal transmission.

Such software may also include information (e.g., data) carried as a data signal on a data carrier, such as a carrier wave. For example, machine-executable information may be included as a data-carrying signal embodied in a data carrier in which the signal encodes a sequence of instruction, or portion thereof, for execution by a machine (e.g., a computing device) and any related information (e.g., data structures and data) that causes the machine to perform any one of the methodologies and/or embodiments described herein.

Examples of a computing device include, but are not limited to, an electronic book reading device, a computer workstation, a terminal computer, a server computer, a handheld device (e.g., a tablet computer, a smartphone, etc.), a web appliance, a network router, a network switch, a network bridge, any machine capable of executing a sequence of instructions that specify an action to be taken by that machine, and any combinations thereof. In one example, a computing device may include and/or be included in a kiosk.

Figure 5:
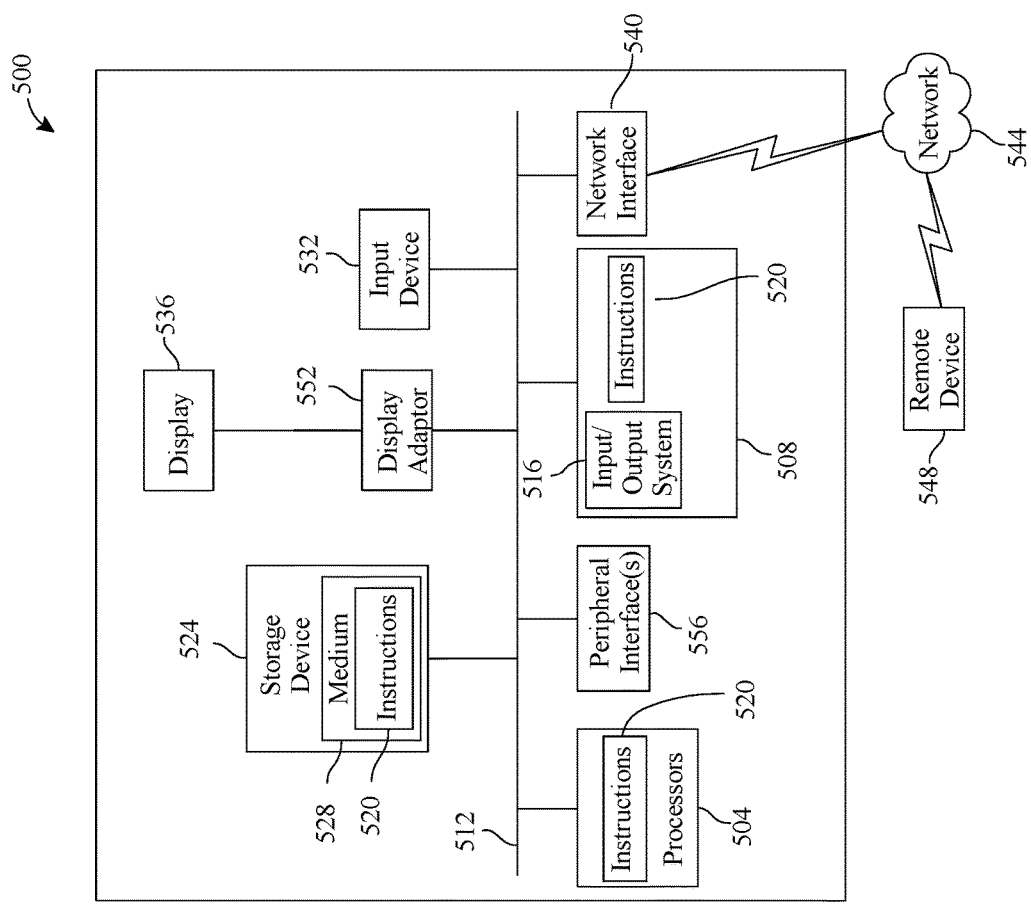
FIG. 5 is a block diagram of a computing system that can be used to implement any one or more of the methodologies disclosed herein and any one or more portions thereof.

FIG. 5 shows a diagrammatic representation of one embodiment of a computing device in the exemplary form of a computer system 500 within which a set of instructions for causing a control system to perform any one or more of the aspects and/or methodologies of the present disclosure may be executed. It is also contemplated that multiple computing devices may be utilized to implement a specially configured set of instructions for causing one or more of the devices to perform any one or more of the aspects and/or methodologies of the present disclosure. Computer system 500 includes a processor 504 and a memory 508 that communicate with each other, and with other components, via a bus 512. Bus 512 may include any of several types of bus structures including, but not limited to, a memory bus, a memory controller, a peripheral bus, a local bus, and any combinations thereof, using any of a variety of bus architectures.

Memory 508 may include various components (e.g., machine-readable media) including, but not limited to, a random-access memory component, a read only component, and any combinations thereof. In one example, a basic input/output system 516 (BIOS), including basic routines that help to transfer information between elements within computer system 500, such as during start-up, may be stored in memory 508. Memory 508 may also include (e.g., stored on one or more machine-readable media) instructions (e.g., software) 520 embodying any one or more of the aspects and/or methodologies of the present disclosure. In another example, memory 508 may further include any number of program modules including, but not limited to, an operating system, one or more application programs, other program modules, program data, and any combinations thereof.

Computer system 500 may also include a storage device 524. Examples of a storage device (e.g., storage device 524) include, but are not limited to, a hard disk drive, a magnetic disk drive, an optical disc drive in combination with an optical medium, a solid-state memory device, and any combinations thereof. Storage device 524 may be connected to bus 512 by an appropriate interface (not shown). Example interfaces include, but are not limited to, SCSI, advanced technology attachment (ATA), serial ATA, universal serial bus (USB), IEEE 1594 (FIREWIRE), and any combinations thereof. In one example, storage device 524 (or one or more components thereof) may be removably interfaced with computer system 500 (e.g., via an external port connector (not shown)). Particularly, storage device 524 and an associated machine-readable medium 528 may provide nonvolatile and/or volatile storage of machine-readable instructions, data structures, program modules, and/or other data for computer system 500. In one example, software 520 may reside, completely or partially, within machine-readable medium 528. In another example, software 520 may reside, completely or partially, within processor 504.

Computer system 500 may also include an input device 552. In one example, a user of computer system 500 may enter commands and/or other information into computer system 500 via input device 552. Examples of an input device 552 include, but are not limited to, an alpha-numeric input device (e.g., a keyboard), a pointing device, a joystick, a gamepad, an audio input device (e.g., a microphone, a voice response system, etc.), a cursor control device (e.g., a mouse), a touchpad, an optical scanner, a video capture device (e.g., a still camera, a video camera), a touchscreen, and any combinations thereof. Input device 552 may be interfaced to bus 512 via any of a variety of interfaces (not shown) including, but not limited to, a serial interface, a parallel interface, a game port, a USB interface, a FIREWIRE interface, a direct interface to bus 512, and any combinations thereof. Input device 552 may include a touch screen interface that may be a part of or separate from display 556, discussed further below. Input device 552 may be utilized as a user selection device for selecting one or more graphical representations in a graphical interface as described above.

A user may also input commands and/or other information to computer system 500 via storage device 524 (e.g., a removable disk drive, a flash drive, etc.) and/or network interface device 540. A network interface device, such as network interface device 540, may be utilized for connecting computer system 500 to one or more of a variety of networks, such as network 544, and one or more remote devices 548 connected thereto. Examples of a network interface device include, but are not limited to, a network interface card (e.g., a mobile network interface card, a LAN card), a modem, and any combination thereof. Examples of a network include, but are not limited to, a wide area network (e.g., the Internet, an enterprise network), a local area network (e.g., a network associated with an office, a building, a campus or other relatively small geographic space), a telephone network, a data network associated with a telephone/voice provider (e.g., a mobile communications provider data and/or voice network), a direct connection between two computing devices, and any combinations thereof. A network, such as network 544, may employ a wired and/or a wireless mode of communication. In general, any network topology may be used. Information (e.g., data, software 520, etc.) may be communicated to and/or from computer system 500 via network interface device 540.

Computer system 500 may further include a video display adapter 552 for communicating a displayable image to a display device, such as display device 556. Examples of a display device include, but are not limited to, a liquid crystal display (LCD), a cathode ray tube (CRT), a plasma display, a light emitting diode (LED) display, and any combinations thereof. Display adapter 552 and display device 556 may be utilized in combination with processor 504 to provide graphical representations of aspects of the present disclosure. In addition to a display device, computer system 500 may include one or more other peripheral output devices including, but not limited to, an audio speaker, a printer, and any combinations thereof. Such peripheral output devices may be connected to bus 512 via a peripheral interface 556. Examples of a peripheral interface include, but are not limited to, a serial port, a USB connection, a FIREWIRE connection, a parallel connection, and any combinations thereof.

The foregoing has been a detailed description of illustrative embodiments of the invention. Various modifications and additions can be made without departing from the spirit and scope of this invention. Features of each of the various embodiments described above may be combined with features of other described embodiments as appropriate in order to provide a multiplicity of feature combinations in associated new embodiments. Furthermore, while the foregoing describes a number of separate embodiments, what has been described herein is merely illustrative of the application of the principles of the present invention. Additionally, although particular methods herein may be illustrated and/or described as being performed in a specific order, the ordering is highly variable within ordinary skill to achieve methods, systems, and software according to the present disclosure. Accordingly, this description is meant to be taken only by way of example, and not to otherwise limit the scope of this invention.

Exemplary embodiments have been disclosed above and illustrated in the accompanying drawings. It will be understood by those skilled in the art that various changes, omissions, and additions may be made to that which is specifically disclosed herein without departing from the spirit and scope of the present invention.

What is claimed is:

1. A system for chaining biographic inputs using artificial intelligence, the system comprising:

a computing device with at least a processor configured to generate at least a machine-learning algorithm;

a biographic parameter module communicatively connected to the computing device, wherein the biographic parameter module is configured to:

receive a first biographic input, wherein the first biographic input is utilized in combination with the at least a machine-learning algorithm to locate data relating to the first biographic input;

parse the first biographic input to retrieve at least a key element comprising at least a textual datum, wherein parsing the first biographic input further comprises:

generating a vector space;

representing each extracted word from the at least a textual datum as a unique word vector of a plurality of word vectors in the vector space, wherein each unique word vector of the plurality of word vectors comprises a number representing an enumeration of co-occurrences of the extracted word with another word; and determining a likelihood that each extracted word indicates a given category of a user's life;

retrieve stored data comprising a plurality of elements relating to the at least a key element, wherein each element of the plurality of elements further comprises a plurality of biographic inputs;

sort the plurality of biographic inputs into life theme categories using a classifier automatedly trained by a plurality of training data; and generate at least a life theme association, wherein generating the at least a life theme association comprises detecting at least an association between the at least a key element and the life theme categories by utilizing a language evaluation module, wherein the language evaluation module comprises statistical correlations indicating a positive or negative association between at least an extracted word from the at least a key element and a given category of a user's life; and a chaining module communicatively connected to the computing device, wherein the chaining module is configured to:

receive the first biographic input and an element of stored data from the biographic parameter module;

evaluate the first biographic input and the element of stored data to determine a relation between the first biographic input and the element of stored data as a function of the at least a life theme association;

determine the relation between the first biographic input and the element of stored data by classifying the first biographic input to a first life theme and the element of stored data to a second life theme to determine if the first life theme and the second life theme are related;

generate a request for a second biographic input, relating to the at least a key element associated with the first biographic input, from an entity outside of a user's network in response to the determination of the relation between the first biographic input and the element of stored data; and chain the first biographic input and the element of stored data to the second biographic input in response to the request for the second biographic input.

2. The system of claim 1, wherein the biographic parameter module is configured to receive the first biographic input from a user device.

3. The system of claim 1, wherein the biographic parameter module is configured to receive the first biographic input from a user network device.

4. The system of claim 1, wherein the biographic parameter module is further configured to: generate a query utilizing the first biographic input; and retrieve the element of stored data utilizing the query.

5. The system of claim 4, wherein the query relates to a category.

6. The system of claim 4, wherein the query relates to a participant.

7. The system of claim 1, wherein the biographic parameter module is further configured to:

classify the first biographic input to a life theme using a first classification algorithm; and retrieve an element of stored data relating to the life theme.

8. The system of claim 1, wherein the chaining module is further configured to:

generate a biographic learner, wherein the biographic learner learns user milestones by evaluating biographic inputs relating to a user, using a machine-learning process; and create a milestone label for the first biographic input and the element of stored data.

9. The system of claim 8, wherein the chaining module is further configured to:

generate the request for the second biographic input utilizing the milestone label; and transmit the request for the second biographic input to a user network device.

10. The system of claim 1, wherein the chaining module is further configured to:

receive a second biographic input from a user network device; and chain the second biographic input to the first biographic input.

11. A method of chaining biographic inputs using artificial intelligence, the method comprising:

receiving by a computing device with at least a processor configured to generate at least a machine-learning algorithm, a first biographic input wherein the first biographic input identifies a user;

using by the computing device with the at least a machine-learning algorithm in combination with the first biographic input to locate data relating to the first biographic input;

parsing by the computing device, the first biographic input to retrieve at least a key element, wherein the at least a key element comprises at least a textual datum, wherein parsing the first biographic input further comprises:

generating a vector space;

representing each extracted word from the at least a textual datum as a unique word vector of a plurality of word vectors in the vector space, wherein each unique word vector of the plurality of word vectors comprises a number representing an enumeration of co-occurrences of the extracted word with another word; and determining a likelihood that each extracted word indicates a given category of a user's life;

retrieving, by the computing device, stored data comprising a plurality of elements relating to the at least a key element, wherein each element of the plurality of elements further comprises a plurality of biographic inputs;

sorting, by the computing device, the plurality of biographic inputs into life theme categories using a classifier automatedly trained by a plurality of training data;

generating, by the computing device, at least a life theme association, wherein generating the at least a life theme association comprises detecting at least an association between the at least a key element and the life theme categories by utilizing a language evaluation module, wherein the language evaluation module includes statistical correlations indicating a positive or negative association between at least an extracted word from the at least a key element and a given category of a user's life;

evaluating, by the computing device, the first biographic input and an element of stored data to determine a relation between the first biographic input and the element of stored data, wherein evaluating the first biographic input and the element of stored data comprises:

determining the relation between the first biographic input and the element of stored data by classifying the first biographic input to a first life theme and the element of stored data to a second life theme to determine if the first life theme and the second life theme are related; and generating a request for a second biographic input, relating to the at least a key element associated with the first biographic input, from an entity outside of a user's network in response to the determination of the relation between the first biographic input and the element of stored data; and chaining the first biographic input and the element of stored data to the second biographic input in response to receiving the requested second biographic input.

12. The method of claim 11, wherein the computing device receives the first biographic input from a user device.

13. The method of claim 11, wherein the computing device receives the first biographic input from a user network device.

14. The method of claim 11, wherein retrieving the stored data further comprises:

generating a query utilizing the first biographic input; and retrieving the element of stored data utilizing the query.

15. The method of claim 14, wherein the query relates to a category.

16. The method of claim 14, wherein the query relates to a participant.

17. The method of claim 11, wherein retrieving the stored data further comprises:

classifying the first biographic input to a life theme using a first classification algorithm; and retrieving an element of stored data relating to the life theme.

18. The method of claim 11, wherein evaluating the first biographic input further comprises:

generating a biographic learner, wherein the biographic learner learns user milestones by evaluating biographic inputs relating to a user using a machine-learning process; and creating a milestone label for the first biographic input and the element of stored data.

19. The method of claim 18 further comprising:

generating the request for the second biographic input utilizing the milestone label; and transmitting the request for the second biographic input to a user network device.

20. The method of claim 11 further comprising:

receiving a second biographic input from a user network device; and chaining the second biographic input to the first biographic input.

* * * * *